United States Patent Office 3,189,886
Patented June 15, 1965

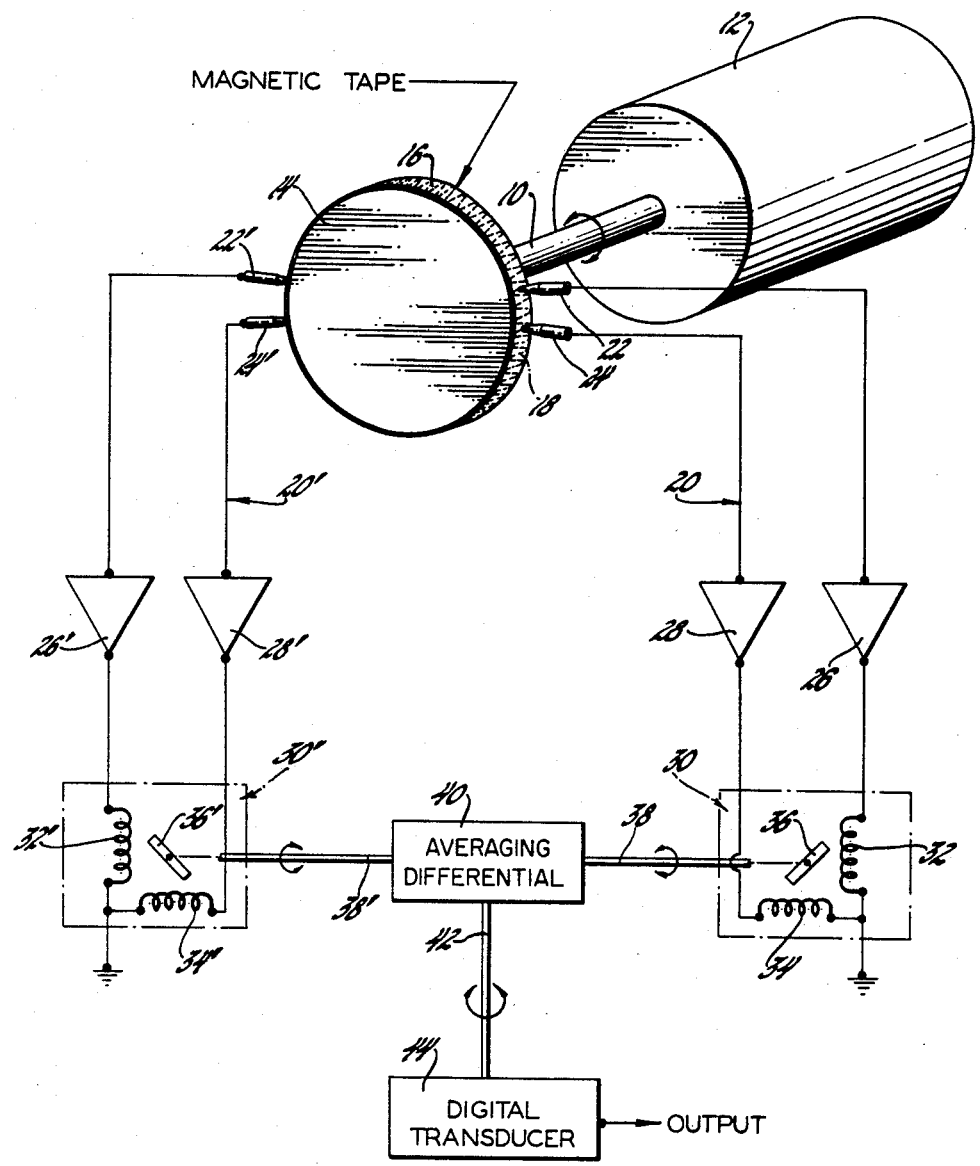

3,189,886
DISPLACEMENT AMPLIFIER
George E. Sonntag, Milwaukee, Wis., assignor to General Motors Corporation, Detroit, Mich., a corporation of Delaware
Filed Feb. 6, 1961, Ser. No. 87,432
3 Claims. (Cl. 340—271)

This invention relates to a displacement amplifier and more particularly to an electromechanical system utilizing a prerecorded magnetic tape as a source of signals indicative of displacement.

In many applications it is necessary to very accurately measure the amount or rate of displacement of an element. This is particularly true in measuring the rotary displacement of a gyroscope of the type used in automatic guidance system. Many forms of rotation detectors have been devised, all of which are limited in accuracy due to the very small amount of displacement which must be detected.

The purpose of this invention is to provide a magnetic recording and means responsive thereto to accurately amplify the displacement of a mechanical element so that measurements of the amount and rate of displacement may readily be made.

The invention is carried out by providing the element with a magnetic sinusoidal signal and adjacent pickup heads for generating a corresponding electrical signal according to the position of the element, and motor means driven by the electrical signal through a displacement proportional to the displacement of the said element.

The above and other advantages of the invention will be made more apparent from the following description taken in conjunction with the accompanying drawing which is a schematic electromechanical diagram of a shaft rotation amplifier according to the invention.

As may be seen in the drawing, the shaft or element 10 which may be driven by a gyroscope 12 whose rotation is to be amplified has secured thereto a disc or turntable 14. A magnetic film or tape 16 is secured to the periphery of the turntable 14. A simple sinusoidal signal schematically represented by broken lines 18 is recorded on the tape 16 with a high degree of accuracy and preferably has a large number of cycles per unit length, e.g. 500 cycles per inch. If the turntable 14 has a circumference of 10 inches, then a signal of 500 cycles per inch will provide 5,000 sinusoidal pulses distributed along the length of the tape 16. The signal 18 recorded on the magnetic tape 16 is a simple sinusoidal flux density variation as a function of displacement along the length of the tape 16.

The system includes two parallel identical circuits 20 and 20' one of which will now be described. Circuit 20 has a pair of pickup heads 22 and 24 adjacent the magnetic tape 16. The pickup heads 22 and 24 are positioned to sense the magnetic flux density at the adjacent point of the tape 16 and produce an electrical signal proportional to the magnetic strength of the recorded signal 18 at that particular point. When displacement occurs the output will vary sinusoidally as a function of displacement. The pickup heads 22 and 24 do not require a change of flux for their operation but rather are flux bridge devices which detect flux unbalance with turntable velocity approaching zero. The heads then are responsive to flux density. One of the pickups 22, 24 of each pair is located 90 electrical degrees out of phase with the other so that as the turntable 14 rotates, one of the pickups 22, 24 will generate a sine signal and the other will generate a corresponding cosine signal. Each of these electrical signals is sent through an amplifier 26 or 28 and then fed to a two-phase synchronous motor. The particular motor 30 depicted schematically in the drawing comprises a pair of stator coils 32, 34 in quadrature, each being connected to one of the amplifiers 26, 28 so that the sine and cosine signals will produce a rotating magnetic field wherein the vector resultant of the field makes one revolution for each sine cycle fed to the coils 32, 34. A permanent bar magnet 36 in the magnetic field will align itself with the field and thereby rotate as the magnetic field changes. The magnet 36 thus forms the rotor of the motor 30 and has its output shaft 38 secured thereto. The output shaft 38, 38' from each side of the system is connected to a differential 40 which has an output shaft 42 whose rotation is equal to the average of the rotation of shafts 38 and 38'. The differential output shaft 42 may then be associated with a digital shaft position transducer 44, for example, whose output may be connected to any desired control circuit.

In operation if the turntable 14 rotates through an angle sufficient to traverse one cycle of the sinewave 18, the signals generated by each pair of pickups 22, 24 and 22', 24' will, when amplified, cause one revolution of rotation of the respective motor 30. The differential 40 serves to cancel out any errors due to mechanical eccentricity of the turntable 14 or inaccuracies of recording the sine signal 18 onto the tape 16. For best results, the pickup heads 22', 24' are diametrically opposite heads 22, 24. In this connection it will be seen that somewhat the same sort of error compensation is inherent by having two pickups control each motor. If desired, full advantage may be taken of this feature by placing the four pickups 22, 24, 22', 24' substantially equidistant about the turntable 14 to obtain a better averaging of all the mechanical errors.

It is readily seen that this invention provides a means for amplifying the movement of a mechanical element in order to facilitate the accurate measurement of the amount or rate of displacement of that element. In the preferred embodiment described, the magnetic tape or film 16 of the turntable 14 has 5,000 cycles recorded thereon. Since the motor 30, 30' will go one revolution per cycle of input 18, the rotation of the turntable is amplified by a factor of 5,000; that is, one second of rotation of the turntable 14 will produce approximately 1.4 degrees of rotation of the output shaft 42, or 4.3 minutes of turntable rotation is equivalent to one revolution of the output shaft 42. This amplification is made possible by the concept of using a magnetic tape moveable with one of the relatively displaceable elements where the tape carries a prerecorded sinusoidal flux density variation which is a function of the displacement.

Of course many departures from the disclosure may be made within the spirit of the invention. The above disclosure is merely the preferred embodiment of the invention and is not intended to limit the scope thereof beyond that defined by the following claims.

I claim:
1. A rotation amplifier comprising a rotatable element having simple sine pulses recorded thereon, pickup means associated with said element for generating signals corresponding to said pulses, a plurality of motors driven by said signals, each having an output rotation substantially proportional to the rotation of said element and a differential means driven by said motors for averaging the rotation of said motors.

2. A shaft rotation amplifier comprising a disc secured to a shaft for rotation therewith, simple sinusoidal pulses magnetically recorded on the periphery of said disc, two pairs of magnetic pickups adjacent said disc to sense the pulses, the pickups of each pair being located 90 electrical degrees out of phase, each of said pickups generating a signal corresponding to the flux density of the magnetic pulses, means for amplifying said signals, two-phase synchronous motor means driven by signals from each pair of pickups, and a differential connected with said motor means for averaging the outputs thereof.

3. A displacement amplifier comprising a magnetic recording tape secured to the element whose displacement is to be amplified, simple sinusoidal flux density pulses recorded on said tape, two pairs of pickups adjacent said tape to sense the pulses, the pickups of each pair being located 90 electrical degrees out of phase, each of said pickups generating a signal corresponding to the flux density of the recorded pulses, means for amplifying said signals, a two-phase synchronous motor means driven by signals from each pair of pickups, and a differential connected to said motor means for averaging the outputs thereof.

References Cited by the Examiner

UNITED STATES PATENTS

| | | | |
|---|---|---|---|
| 2,480,065 | 8/49 | Wanner | 318—13 X |
| 2,651,746 | 9/53 | Gano | 318—162 |
| 2,680,241 | 6/54 | Gridley | 340—271 |
| 2,683,247 | 7/54 | Wiley | 324—70 X |
| 2,730,698 | 1/56 | Daniels et al. | 340—206 |
| 2,765,459 | 10/56 | Winter | 340—206 |
| 2,782,626 | 2/57 | Jochum et al. | 324—70 X |
| 2,926,335 | 2/60 | Bower | 340—271 X |
| 2,948,467 | 8/60 | Muffly | 318—162 X |
| 2,994,075 | 7/61 | Abbott | 340—271 |

FOREIGN PATENTS 729,894 12/42 Germany.

NEIL C. READ, *Primary Examiner.*

BENNETT G. MILLER, *Examiner.*